US011968750B2

(12) United States Patent
Young et al.

(10) Patent No.: US 11,968,750 B2
(45) Date of Patent: *Apr. 23, 2024

(54) SYSTEM AND METHOD FOR SESSION RELOCATION AT EDGE NETWORKS

(71) Applicant: Verizon Patent and Licensing Inc., Basking Ridge, NJ (US)

(72) Inventors: Kristen Sydney Young, Morris Plains, NJ (US); Kalyani Bogineni, Hillsborough, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,150

(22) Filed: Feb. 28, 2022

(65) Prior Publication Data

US 2022/0183108 A1 Jun. 9, 2022

Related U.S. Application Data

(63) Continuation of application No. 17/066,717, filed on Oct. 9, 2020, now Pat. No. 11,297,685, which is a
(Continued)

(51) Int. Cl.
*H04W 80/10* (2009.01)
*H04W 8/08* (2009.01)
(Continued)

(52) U.S. Cl.
CPC ............ *H04W 80/10* (2013.01); *H04W 8/08* (2013.01); *H04W 48/16* (2013.01); *H04W 48/18* (2013.01); *H04W 76/11* (2018.02); *H04W 76/30* (2018.02)

(58) Field of Classification Search
None
See application file for complete search history.

(56) References Cited

U.S. PATENT DOCUMENTS

| 10,474,359 B1 | 11/2019 | Volpe et al. |
| 2018/0192471 A1* | 7/2018 | Li ........................ H04W 16/04 |

(Continued)

OTHER PUBLICATIONS

"3GPP TR 23.725 V16.1.0 (Mar. 2019)", Technical Specification, pp. 40-43.

(Continued)

*Primary Examiner* — Scott M Sciacca

(57) ABSTRACT

A method, a device, and a non-transitory storage medium provide for provisioning network resources of multi-access edge computing (MEC) networks in support of an application service session for an end device; assigning an IP address to the end device for use in a first coverage area served by a first MEC network of the MEC networks; receiving, by a first application function (AF) device at the first MEC network, a session mobility notification for the end device with respect to the first coverage area and a second coverage area served by a second MEC network of the MEC networks; setting, responsive to the session mobility notification, an allotted time for relocating the application service session from the first MEC network to the second MEC network; and transferring, during the allotted time, application context corresponding to the relocated application service session to a second AF device at the second MEC network.

20 Claims, 13 Drawing Sheets

Related U.S. Application Data continuation of application No. 16/538,159, filed on Aug. 12, 2019, now Pat. No. 10,841,974.

(51) Int. Cl.
  *H04W 48/16* (2009.01)
  *H04W 48/18* (2009.01)
  *H04W 76/00* (2018.01)
  *H04W 76/11* (2018.01)
  *H04W 76/30* (2018.01)

(56) References Cited

U.S. PATENT DOCUMENTS

| | | | |
|---|---|---|---|
| 2018/0270720 A1* | 9/2018 | Shi | H04W 40/36 |
| 2019/0045005 A1 | 2/2019 | Verrall et al. | |
| 2019/0158606 A1 | 5/2019 | Guim Bernat et al. | |
| 2019/0220703 A1 | 7/2019 | Prakash et al. | |
| 2019/0246252 A1 | 8/2019 | Rasmusson et al. | |
| 2020/0169871 A1 | 5/2020 | Zhu et al. | |
| 2020/0228880 A1 | 7/2020 | Iyer et al. | |
| 2020/0229038 A1 | 7/2020 | Zhu et al. | |
| 2020/0337093 A1* | 10/2020 | Kim | H04W 64/00 |
| 2020/0366732 A1* | 11/2020 | Trang | H04W 48/20 |
| 2021/0059011 A1 | 2/2021 | Fang et al. | |
| 2022/0360977 A1* | 11/2022 | Kim | H04W 36/12 |

OTHER PUBLICATIONS

"3rd Generation Partnership Project; Technical Specification Group Services and System Aspects; Procedures for the ) G System; Stage 2 (Release 15)", 3GPP TS 23.502 V15.4.0 (Dec. 2018), 346 pages.

"3rd Generation Partnership Project; Technical Specification Group Services and System Aspects; Service requirements for the 5G system; Stage 1 (Release 16)", GPP TS 22.261 V16.6.0 (Dec. 2018), 73 pages.

"3rd Generation Partnership Project; Technical Specification Group Services and System Aspects; System Architecture for the 5G System; Stage 2 (Release 15)", 3GPP TS 23.501 V15.4.0 (Dec. 2018), 236 pages.

* cited by examiner

SYSTEM AND METHOD FOR SESSION RELOCATION AT EDGE NETWORKS

CROSS REFERENCE TO RELATED APPLICATIONS

The patent application is a continuation of U.S. patent application Ser. No. 17/066,717 titled "SYSTEM AND METHOD FOR SESSION RELOCATION AT EDGE NETWORKS," filed on Oct. 9, 2020, which is a continuation of U.S. patent application Ser. No. 16/538,159, titled "SYSTEM AND METHOD FOR SESSION RELOCATION AT EDGE NETWORKS," filed on Aug. 12, 2019 (now U.S. Pat. No. 10,841,974), the contents of which are hereby incorporated by reference in their entirety.

BACKGROUND

Development and design of networks present technological challenges from a network-side perspective and an end device perspective. Service providers are deploying multi-access edge computing (MEC), also known as mobile edge computing, whereby core network capabilities (e.g., computational, storage, etc.) are situated at different points in the network, including the network "edge" to improve latency at an application service layer and to reduce the amount of data traffic at the core network. That is, MEC platforms may provide services faster than other cloud-based services or a local end device processor.

DETAILED DESCRIPTION OF EXAMPLE EMBODIMENTS

Figure 1A:
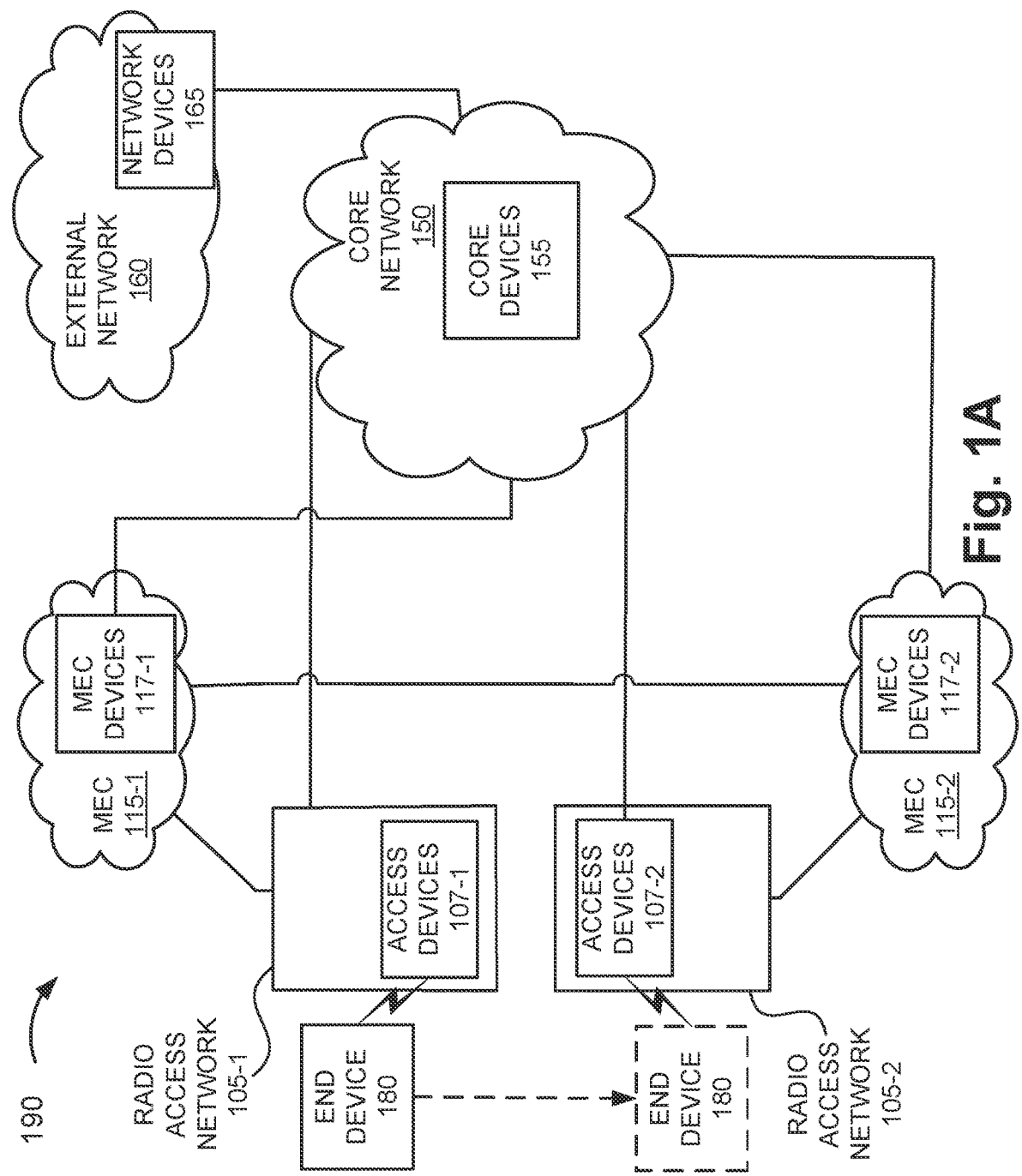
FIG. 1A is a diagram illustrating an exemplary environment in which an exemplary embodiment of a session relocation service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as "application service layer network") provide varied network resources (e.g., physical, logical, virtual) to service end devices operating in a coverage area. For example, a particular MEC network may implement network resources for a limited number of end devices/users being served, the number of applications executing at any given time, the amount of traffic involved, the state of the MEC network (e.g., in the process of being deployed, reconfigured, upgraded; failures, congestion, etc.), and/or the state of neighboring MEC networks (e.g., failures, congestion, etc.). Consequently, MEC networks or other types of application service layer networks may support a particular level of quality of service associated with an application and/or a service (referred to as an "application service"). For example, the delivery of an application service to an end device may enhance various performance metrics, such as latency, error rate, throughput, packet loss, etc. Depending on the types of applications and services requested from the end devices, MEC servers may or may not be used, and/or MEC networks may reside in different parts of a network (e.g., co-located with an access network, co-located with a core network, co-located with a backhaul/fronthaul network, etc.) that are configurable to provide different services and applications, and support different performance parameters. Configurable network policies and/or rules that include threshold parameters and values may be applied to efficiently manage the allocation and utilization of network resources responsive to the demands of the end devices.

MEC networks and other types of application service layer networks may use a virtualization technology for provisioning of an application service. For example, the virtualization of a network device may be implemented based on a virtual container or a virtual machine (VM) (referred to as a "virtual network device") along with other virtualization technology/architecture, such as a hypervisor, a container engine, and underlying hardware resources of the network device (e.g., a host device). The virtualization technology and/or architecture support the creation, deletion, and intermediary operational state (also known as the "lifecycle") of the virtual network device and instance of the application service. A network device may include one or multiple instances of the virtual network device (and associated one or multiple instances of the application service, which may be the same or different application services) and the configuration may differ depending on the virtualization technology and/or architecture implemented.

Technological challenges arise with respect to mobility usage for end devices in MEC networks. In non-MEC wireless mobility, the end device is mobile while the server remains constant—solutions to traditional mobility continuity enable the network to perform lossless U-plane forwarding from the source network to the destination network—essentially hiding the end device mobility from the server, especially when the network provides session (i.e., end device IP address) continuity. In MEC deployment, on the other hand, the server may change as an end device moves from the coverage of one MEC to another, thereby presenting a novel challenge to be solved for services that require MEC-based services for end devices that are mobile with respect to the MECs.

According to exemplary embodiments, a session relocation service that is implemented using particular MEC service policies is described. According to an exemplary embodiment, end devices will initially anchor to a packet data unit (PDU) session anchor (PSA) device that includes logic that provides the edge network-based session relocation service. The PSA device includes logic that manages the selection and use of an Internet protocol (IP) scheme for network devices used to provide an application service to end devices. According to an exemplary embodiment, PSA includes a user plane function (UPF) device that enables service continuity for inter-MEC mobility events, as described herein. According to an exemplary embodiment, the network devices are included in different MEC sites of a MEC network, as described herein.

According to an exemplary embodiment, the edge network-based session relocation service may be configured such that the PSA-UPF and a session management function (SMF) provide the application service to end devices based on end device IP assignment policies for network slice identifiers (IDs) and data network names (DNNs). For example, the SMF device may generate and apply UPF anchor and intermediate UPF insertion policies based on the mobility of the end device during the application service session, and the location of the end device and its relationship to the network topology of network devices in the network environment, as described herein. According to an exemplary embodiment, the SMF may include configurable network policies and/or rules that include threshold parameters and values.

According to an exemplary embodiment, the policies applied at central and/or distributed application functions (AFs) coordinate with network devices (e.g., network exposure function (NEF), a policy control function (PCF), SMF), and other AFs in the MEC network of the multi-MEC sites during a migration procedure, as described herein. For example, a central AF or a distributed AF may register with an NEF for AF influence (e.g., session mobility) using a data network access identifier (DNAI) for an AF at each MEC site (or cluster). In one example, a single IP address is used for an end device that moves, for example, from a source MEC site to a target MEC site.

According to an exemplary embodiment, the network device may be configured to select and use one of the anchor nodes and server nodes of the MEC sites to optimize routing of traffic to a source MEC device during a transition (or migration). According to an exemplary embodiment, the network device may obtain application context information during an application service session. In this way, the network device may maintain service continuity during session relocation.

According to an exemplary embodiment, the network devices may manage the preparation, migration, and provisioning of the application service from the source MEC network and source server to an anchor node and a server of a target MEC network in response to a session mobility trigger. According to an exemplary embodiment, subsequent to the provisioning of the application service to a source MEC site, the MEC site and the end device may register for AF influence. According to an exemplary embodiment, the service policies may enable on-demand instantiation of AF resources at a target MEC site. According to an exemplary embodiment, the source MEC network device may mange the preparation, migration, and provisioning of the application service pertaining to these transitions to a target MEC network device.

According to an exemplary embodiment, the network devices include logic that stores and manages session relocation information. For example, the relocation information may include service context information pertaining to anchor nodes, network addresses assigned to end devices by the network device, performance metric information, and other types of information, as described herein. According to an exemplary embodiment, the edge network-based session relocation service includes the assignment of Internet Protocol (IP) addresses to the end devices. According to an exemplary implementation, the IP addresses include a global or permanent IP address and one or multiple temporary IP address, as described herein. In some embodiments, policies may be generated and applied that enable the AF network device to control a timer to release resources at a source MEC network when session relocation is "complete."

As a result, the edge network-based session relocation service may provide session continuity for inter-MEC mobility of the end device. In this regard, use of scarce network resources of MEC networks may be more optimally utilized for the provisioning of an application service to the end device, while maintaining session continuity. For example, when an end device moves out of the coverage area of a source MEC serving node, various service context may need to be maintained. According to some approaches, the session and original network address (e.g., Internet Protocol (IP) address) assigned to the end device may be maintained instead of the session being torn down and a new session and a new network address assignment being established relative to another MEC serving node.

FIG. 1A is a diagram illustrating an exemplary environment 100 in which an exemplary embodiment of the inter-MEC session relocation service may be implemented. As illustrated, environment 100 includes radio access networks (RANs) 105-1 through 105-2 (also referred to collectively as RANs 105, or individually or generally as RAN 105), MEC networks or clusters 115-1 through 115-2 (also referred to collectively as MEC network 115, or individually or generally as MEC network 115), a core network 150, and an external network 160. RAN 105 includes access devices 107-1 through 107-2, MEC networks 115 include MEC devices 117-1 through 117-2, and external network 160 includes network devices 165. Environment 100 further includes end device 180.

The number, the type, and the arrangement of network devices in environment 100, as illustrated and described, are exemplary. The number of end devices 180 is also exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

The number, the type, and the arrangement of networks in environment 100, as illustrated and described, are exemplary. According to an exemplary embodiment, as described herein, environment 100 includes multiple MEC networks (e.g., MEC sites 115). According to an exemplary implementation, the multi-site MEC network includes MEC networks 115 deployed at different proximities to the service provider's network edge.

Environment 100 includes communication links between various network devices, between end device 180 and various network devices, and, for example, between MEC sites 115 and external network 160. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1A. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the edge network-based session relocation service may use at least one of these planes of communication. Additionally, an interface of a network device may be modified relative to a standard interface (e.g., an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and the edge network-based session relocation service, as described herein. According to various exemplary implementations, the interface may be a service-based interface or a reference point-based interface.

RAN 105 may include one or multiple networks of one or multiple types and technologies. For example, RAN 105 may include a Fourth Generation (4G) RAN, a 4.5G RAN, a Fifth Generation (5G) RAN, and/or another type of future generation RAN. By way of further example, RAN 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 105 may further include other types of wireless networks, such as a WiFi network, a Worldwide Interoperability for Microwave Access (WiMAX) network, a local area network (LAN), or another type of network that may provide an on-ramp to another network.

According to various exemplary embodiments, RAN 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, RAN 105 may be implemented according to various wireless technologies (e.g., radio access technology (RAT), etc.), wireless standards, wireless frequencies/bands, and so forth.

RAN 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, RAN 105 may include one or multiple types of access devices 107. For example, access devices 107 may be implemented to include an eNB, a gNB, an eLTE eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

MEC networks 115 include multiple networks of one or multiple network types and technologies. MEC networks 115 provide access and use of services and applications by end device 180. According to an exemplary embodiment, MEC networks 115 are deployed at different proximities to the network edge (e.g., relative to end devices 180). According to an exemplary implementation, MEC network 115 may be co-located to access devices 107 of a particular geographic region within RAN 105, co-located to network devices of a backhaul network (not shown), and/or co-located to core devices 155 of core network 150. In view of this architecture, MEC network 115 co-located to access devices 107 may have a lower latency than both MEC network 115 co-located to the network devices of the backhaul network, and MEC 150 co-located to core network 150. Additionally, MEC network 115 co-located to the network devices of the backhaul network may have a lower latency than MEC network 115 co-located to core devices 155.

MEC network 115 may be implemented using one or multiple technologies including, for example, SDN, network function virtualization (NFV), cloud computing, Infrastructure-as-a-Service (IaaS), Platform-as-a-Service (PaaS), Software-as-a-Service (SaaS), or another type of network technology. Depending on the implementation, MEC network 115 may include, for example, virtualized network functions (VNFs), multi-access (MA) applications/services, and/or servers that provide application services for use by end device 180. MEC network 115 may also include other types of network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices, network resources (e.g., storage devices, communication links, etc.). MEC network 115 may further include network devices that provide core network functionalities (e.g., functions associated with core devices 155, as described herein). For purposes of illustration and description, MEC devices 117 may include the various types of network devices that may be resident in MEC network 115, as described herein.

Figure 1B:
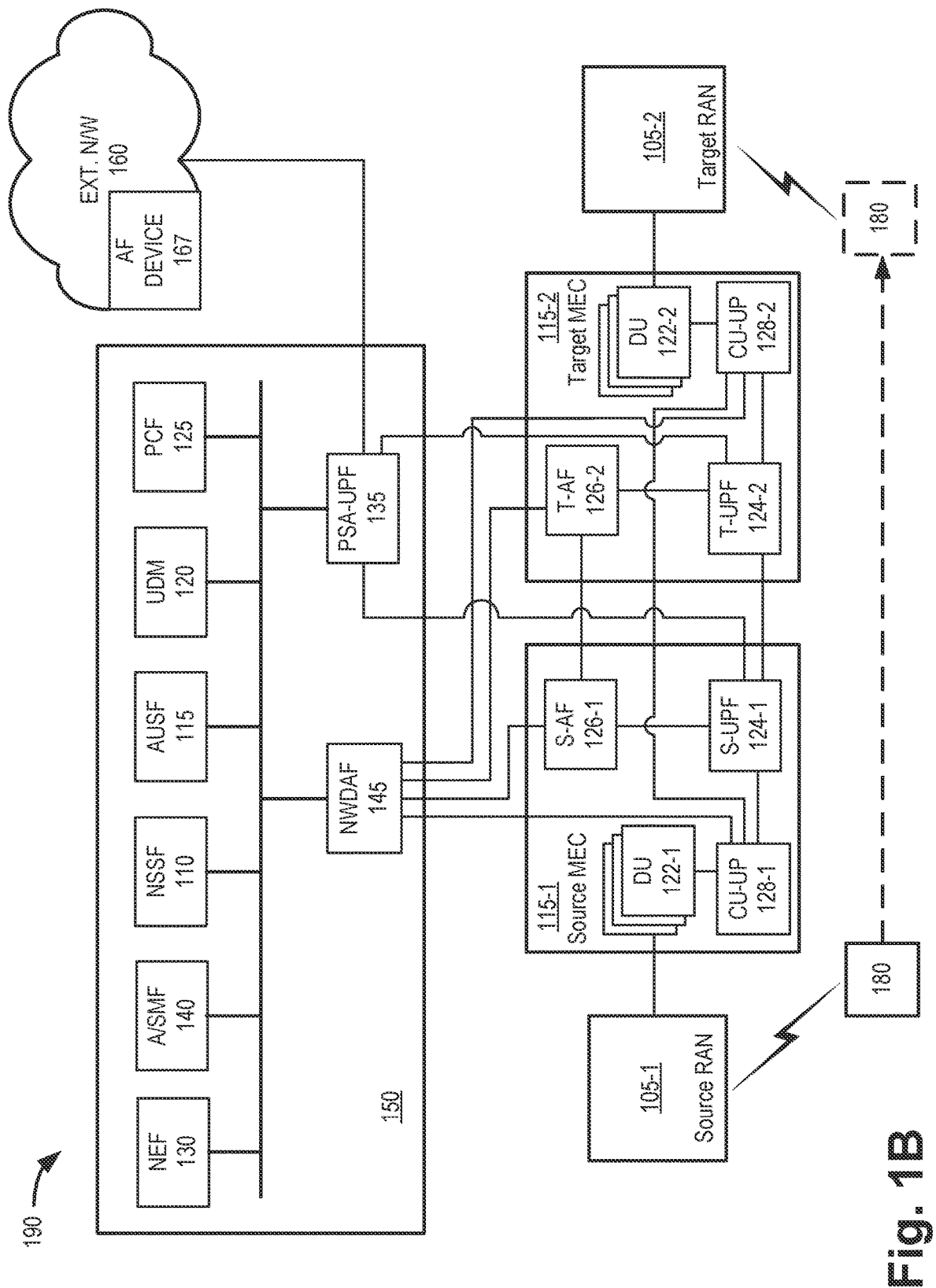
FIG. 1B is a diagram illustrating an exemplary implementation of a configuration for a session relocation service.

Core network 150 may include one or multiple networks of one or multiple network types and technologies. Core network 150 may include a complementary network to RAN 105. For example, core network 150 may be implemented to include an Evolved Packet Core (EPC) of an LTE, an LTE-A network, an LTE-A Pro network, a next generation core (NGC) network, and/or a legacy core network. Depending on the particular implementation, core network 150 may include various network devices, such as for example, an MME, a PGW, a SGW, a PDU session anchor UPF (PSA-UPF), a network data analytics function (NWDAF), a home subscriber server (HSS), an authentication, authorization, and accounting (AAA) server, a policy and charging rules function (PCRF), a charging system (CS), a UPF, an AMF, a SMF, a unified data management (UDM) device, an authentication server function (AUSF), a network slice selection function (NSSF), a network repository function (NRF), a policy control function (PCF), a network exposure function (NEF), as well as others not particularly described herein. According to other exemplary implementations, core network 150 may include additional, different, and/or fewer network devices than those described. For purposes of illustration and description, core devices 155 may include various types of network devices that may be resident in core network 150, as shown in FIG. 1B and described herein.

External network 160 may include one or multiple networks of one or multiple types and technologies. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices 165 that provide various applications, services, or other type of end device assets, such as servers (e.g., web, application, cloud, etc.), mass storage devices, data center devices, and/or other types of network devices pertaining to various network-related functions. For purposes of illustration and description, network devices 165 may include various types of devices that may be resident in external network 160, as described herein. According to an exemplary embodiment, network devices 165 may include a set of default servers that provide an application function (AF), as described herein.

End device 180 may be implemented as a mobile device, a portable device, a stationary device, a device operated by a user, or a device not operated by a user (e.g., an autonomous device). For example, end device 180 may be implemented as a Mobile Broadband device, a smartphone, a computer, a tablet, a netbook, a phablet, a wearable device, a vehicle support system, a game system, a drone, an IoT device, an enhanced MTC device (eMTC) (also known as Cat-M1), a NarrowBand IoT (NB-IoT) device, or some other type of wireless device (e.g., a set top box, a smart television, a music playing device, etc.). According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc.

FIG. 1B is a diagram of exemplary network connections in a network portion 190 of network environment 100. More particularly, network portion 190 illustrates an implementation of the network edge-based session relocation service in a 5G network environment. As shown in FIG. 1B, network portion 190 may include source RAN 105-1, target RAN 105-2, source MEC 115-1, target MEC 115-2, core network 150, external network 160, and end device 180. In the example of FIG. 1B, source RAN 105-1 may include a 5G source RAN and target RAN 105-2 may include a 5G target RAN, which may include a gNB.

Source MEC 115-1 may include a distributed unit (DU) 122-1, a source-UPF 124-1, a source AF 126-1, and centralized unit (CU)-UP 128-1. Target MEC 115-2 may include a DU 122-2, a target-UPF 124-2, a target AF 126-2, and a CU-UP 128-2. Thus, in the configuration of FIG. 1B, intermediate user plane functions (e.g., S-UPF 124-1 and S-UPF 124-2) are located within source MEC 115-1 and target MEC 115-2, respectively, while a PDU session anchor UPF (e.g., PSA-UPF 135) is located at core network 150. MEC devices 117 may automate sequences of activities, tasks, rules, and policies needed for on-demand creation, modification, or removal of network, application, or infrastructure services and resources. MEC devices 117 may provide orchestration at a high level, with an end-to-end view of the infrastructure, network, and applications.

As shown in FIG. 1B, core network 150 may include a Network Data Analytics Function (NWDAF) 145, an NSSF 110, an AUSF 115, a UDM 120, a PCF 125, a NEF 130, PSA-UPF 135, and an AMF/SMF 140, which may correspond, for example, to core devices 155 of FIG. 1. In another implementation, multiple logical components may be executed on a single core device 155.

NSSF 110 may select a set of network slice instances to serve a particular end device 180, determine a particular A/SMF 140 to serve a particular end device 180, and/or perform other types of processes associated with network slice selection or management. AUSF 115 may manage permissions for end device 180. For example, AUSF 115 may verify that end device 180 is authorized to access particular types of network services. UDM 120 may maintain subscription information for end devices 180. For example, UDM 120 may create an authentication vector, manage user profiles, perform subscription management, conduct roaming authorization, etc. PCF 125 may provide policy rules to control plane functions (e.g., to A/SMF 140). NEF 130 may expose capabilities and events to other network functions, including third party NEFs, application functions, edge computing network functions, and/or other types of network functions. A/SMF 140 may perform control plane functions such as registration, authentication, paging, and bearer setup. A/SMF 140 may provide control plane functions, such as assigning an end device IP address, interfacing with QoS policy, and configuring a UPF (e.g., S-UPF 124-1) for packet forwarding.

PSA-UPF 135 may maintain an anchor point for inter-MEC session mobility, maintain an external PDU point of interconnection to a data network (e.g., external network 160), perform packet routing and forwarding, perform the UP part of policy rule enforcement, perform packet inspection, perform traffic usage reporting, enforce QoS policies in the UP, perform uplink traffic verification, perform transport level packet marking, perform downlink packet buffering, send and forward an "end marker" to a RAN node (e.g., a gNB), and/or perform other types of user plane processes. PSA-UPF 135 may communicate with A/SMF 140 (e.g., using an N4 interface) and connect to external network 160 (e.g., using an N6 interface).

NWDAF 145 may include logic that analyzes user equipment (UE) mobility or session relocation information (such as registration for AF influence from PSA-UPF 135 and/or from intermediate UPFs 124). NWDAF 145 may include logic that stores migration threshold parameters and values, and may use these parameters and values for comparison to the parameters and values included in the session relocation information received from MECs 115. The migration threshold parameters and values may pertain to application and service requirements in relation to various network resources (e.g., physical, logical, virtual) including, for example, CPU, GPU, and memory; bandwidth, etc. According to an exemplary embodiment, NWDAF 145 may predict and/or initiate migration of end device 180 from source MEC 115-1 to target MEC 115-2 based on the threshold parameters and values.

AF device 167 includes a network device that provides the inter-MEC session mobility service, as described herein. According to an exemplary embodiment, as illustrated, AF device 167 may be implemented as a network device included in external network 160. According to other exemplary embodiments, AF device 167 may reside in a network different from external network 160 (e.g., in core network 150, etc.). According to an exemplary embodiment, AF device 167 may include logic that provides a default anchor node service. For example, AF device 167 may include a packet data network gateway PGW function, a UPF, or a combination of both.

Resources (e.g., CPU, GPU, RAM, storage, etc.) at each MEC 115 may be virtualized. Applications and services at MEC 115 may consume the virtualized resources. MEC devices 117 at MEC 115 monitor and forecast resource usages at MEC 115. MEC devices 117 at MEC 115 share the resource usage information and resource availability with MEC devices 117 at other MECs 115.

MEC devices 117 may communicate with NWDAF 145 to obtain network status information. MEC devices 117 may communicate with PSA-UPF 135 to obtain application-specific traffic information. MEC devices 117 may communicate with other 5G core network components, such as UDM 120, PCF 125, etc., to obtain other information about the user and service quality requirements. MEC devices 117 may recommend whether the user traffic should use source MEC 115-1 resources or can be routed to resources in target MEC 115-2 when end device 180 relocates.

Although FIG. 1B shows an exemplary arrangement of components of network portion 190, in other implementations, network portion 190 may include fewer components, different components, differently-arranged components, or additional components than depicted in FIG. 1B. For example, in another implementation, an NWDAF component may be included within MECs 115 to reduce the time for MEC devices 117 to get information from NWDAF 105 in core network 150.

Figure 2A:
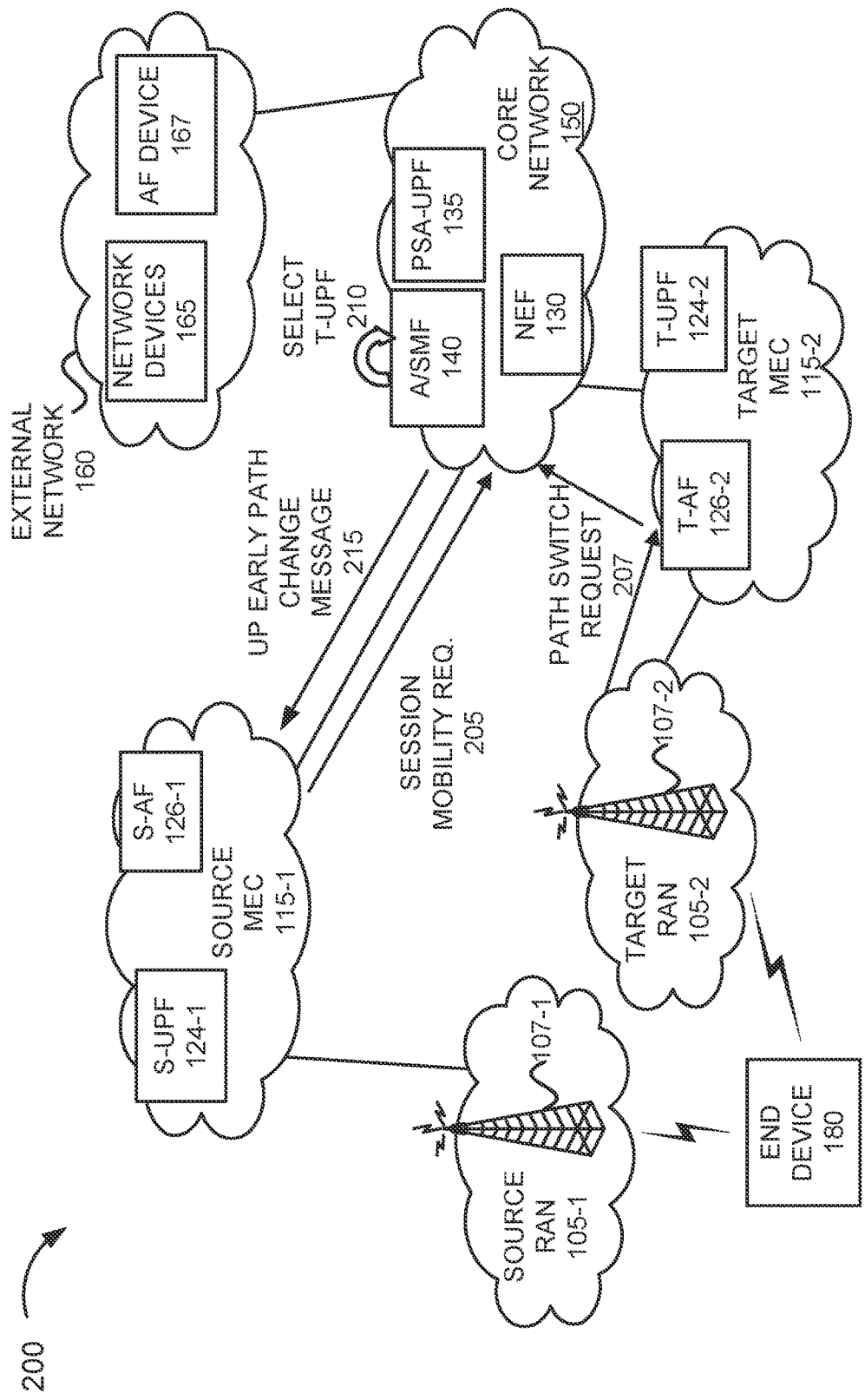
FIGS. 2A-2G are diagrams illustrating exemplary processes of exemplary embodiments of a session relocation service.

FIGS. 2A-2G are diagrams illustrating an exemplary process of an exemplary embodiment of the inter-MEC session relocation service. Referring to FIG. 2A, an environment 200, which is consistent with environment 100, is illustrated.

According to an exemplary scenario, assume that end device 180, source RAN 105-1, and source MEC 115-1 have performed an attachment procedure. The network edge-based session relocation service may include S-AF 126-1 registering for AF influence. For example, S-AF 126-1 may send a session mobility request 205 to NEF 130 for exposure of session mobility events. In some embodiments, S-AF 126-1 requests early mobility notification from A/SMF 140 via NEF 130 in order to instantiate T-AF 126-2. In other embodiments, S-AF 126-1 may get advanced notification from NWDAF 145 via NEF 130 based on a prediction of mobility for end device 180. In other embodiments, AF 167 may request early mobility notification from A/SMF 140 via NEF 130.

As further illustrated in FIG. 2A, target RAN 105-2 may transmit a path switch request 207 to A/SMF 140 via target MEC 115-2. Based on the request 207, A/SMF 140 determines that the intermediate UPF is to be relocated and selects 210 an intermediate UPF, e.g., T-UPF 124-2 from among a number of MEC devices 117-2 at target MEC 115-2 based on, for example, availability, location, performance criteria, etc. A/SMF 140 may send a UP early path change message 215 to S-AF 126-1. Message 215 may include an identification, such as a data network access identifier (DNAI), for S-AF 126-1 and/or T-AF 126-2, as well as a unique identifier for end device 180.

Figure 2B:
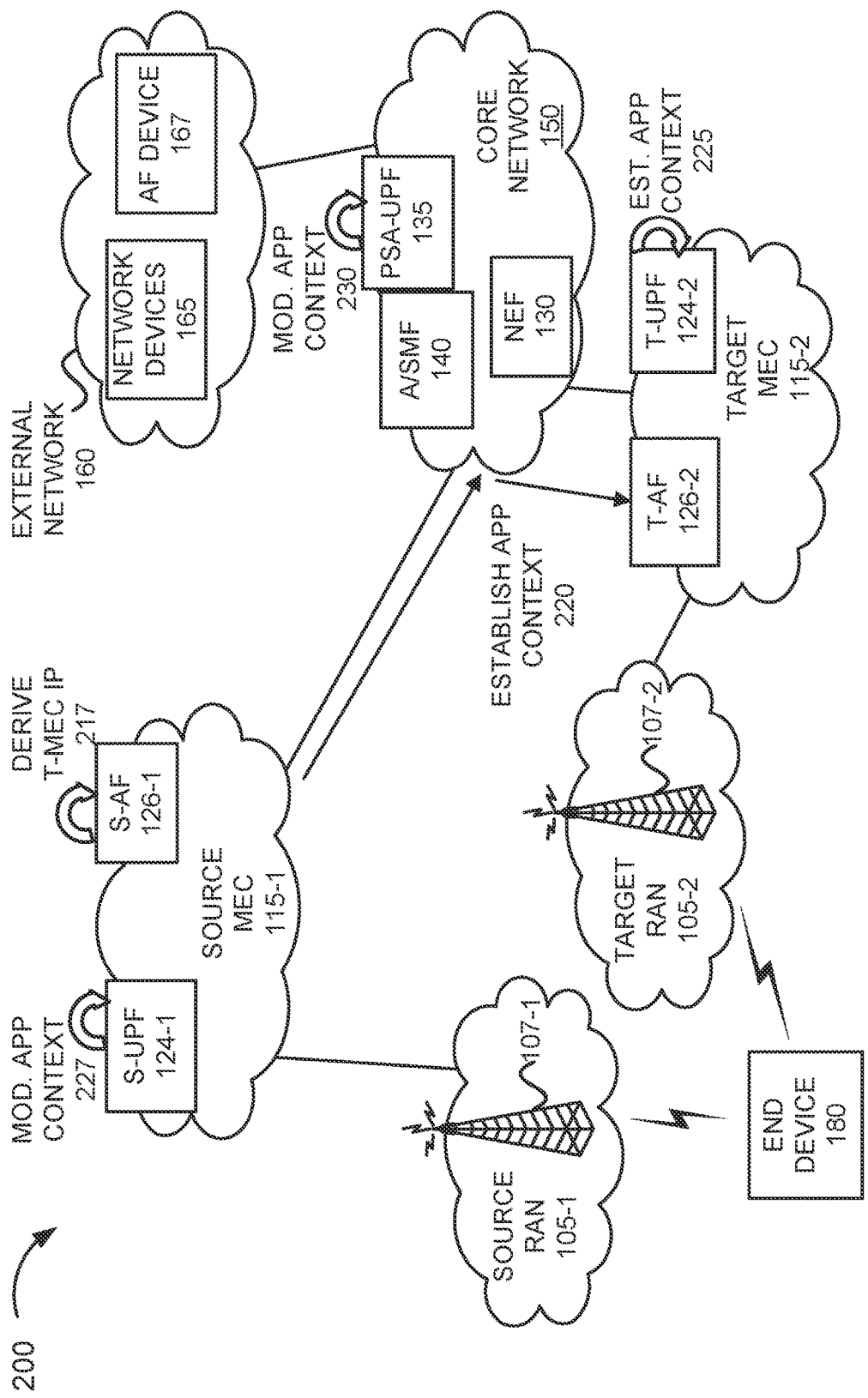

Referring to FIG. 2B, S-AF 126-1 may derive 217 an IP address for target MEC 115-2 based on the message 215. The session relocation service may further include S-AF 126-1 sending a request 220 to establish an application context with T-AF 126-2 using, for example, the IP address for target MEC 115-2. T-UPF 124-2 may establish application context 225, to include instantiation of an application, etc., and A/SMF 140 may modify 227 application context at S-UPF 124-1, and modify 230 application context at PSA-UPF 135.

Figure 2C:
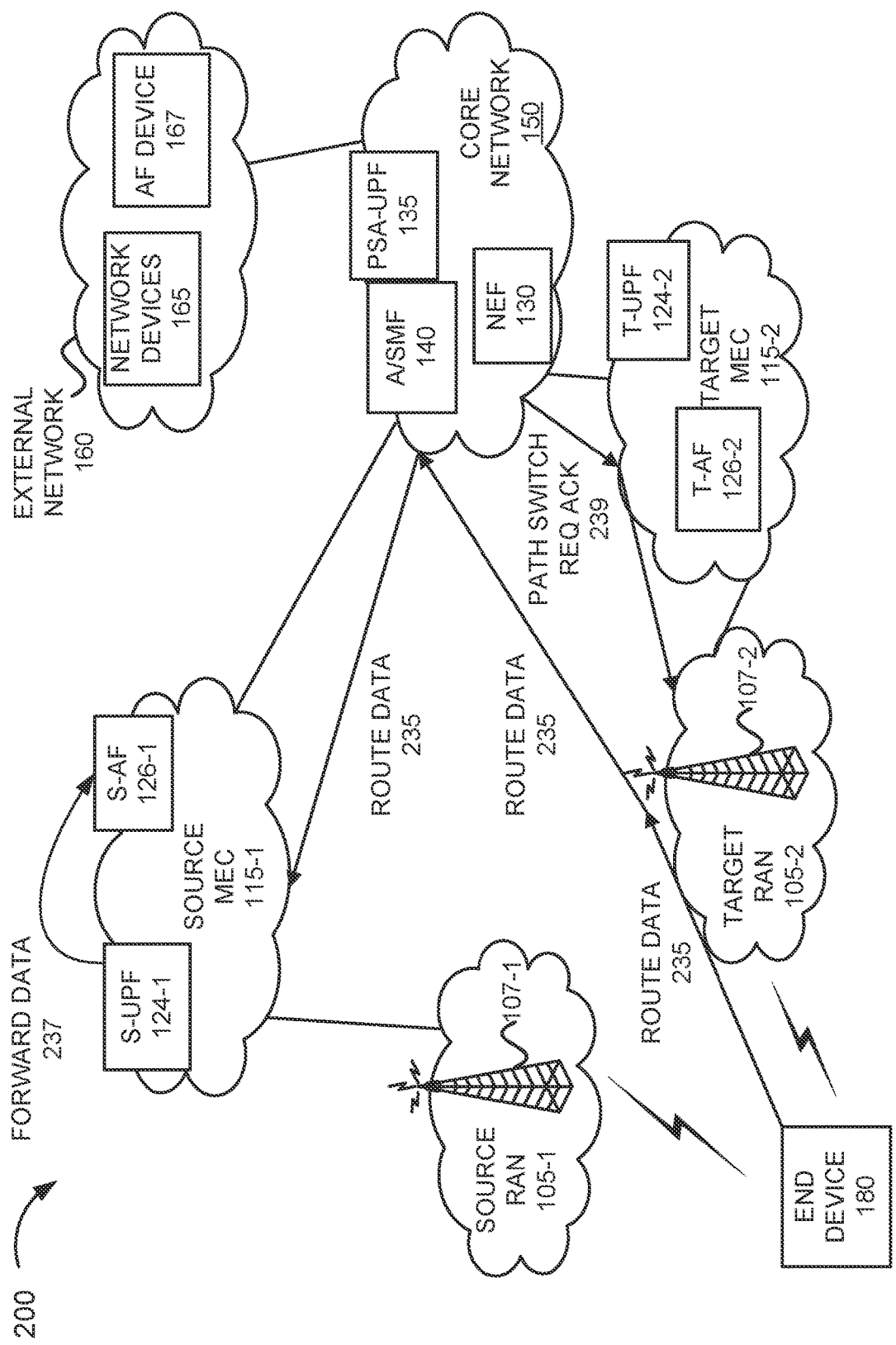

Referring to FIG. 2C, when end device 180 subsequently transmits application data in a coverage area served by target RAN 105-2 (e.g., after establishing a radio connection with target RAN 105-2), the application data addressed to source MEC 115-1 is routed 235 via A/SMF 140 to S-UPF 124-1, which forwards the data 237 directly to S-AF 126-1, without forwarding to T-UPF 124-2. The network edge-based session location service may further include A/SMF 140 sending a path switch request acknowledgement 239 to target RAN 105-2 via target MEC 115-2.

Figure 2D:
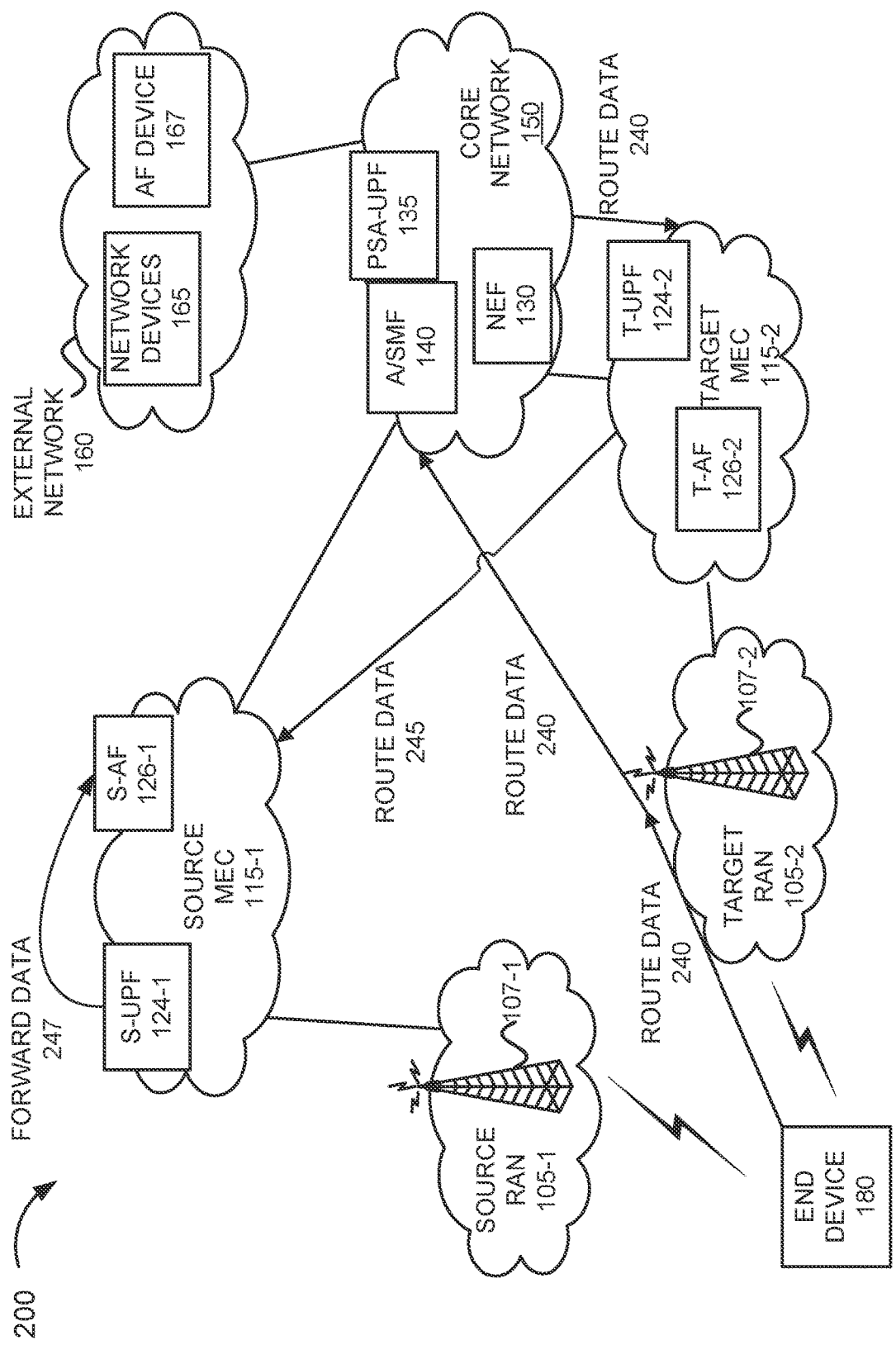

Referring to FIG. 2D, when end device 180 transmits application data in a coverage area served by target RAN 105-2, the application data addressed to source MEC 115-1 is routed 240 via A/SMF 140 to T-UPF 124-2, which sends the data 245 to S-UPF 124-1, which forwards the data 247 directly to S-AF 126-1, to maintain communication between end device 180 and source MEC 115-1.

Figure 2E:
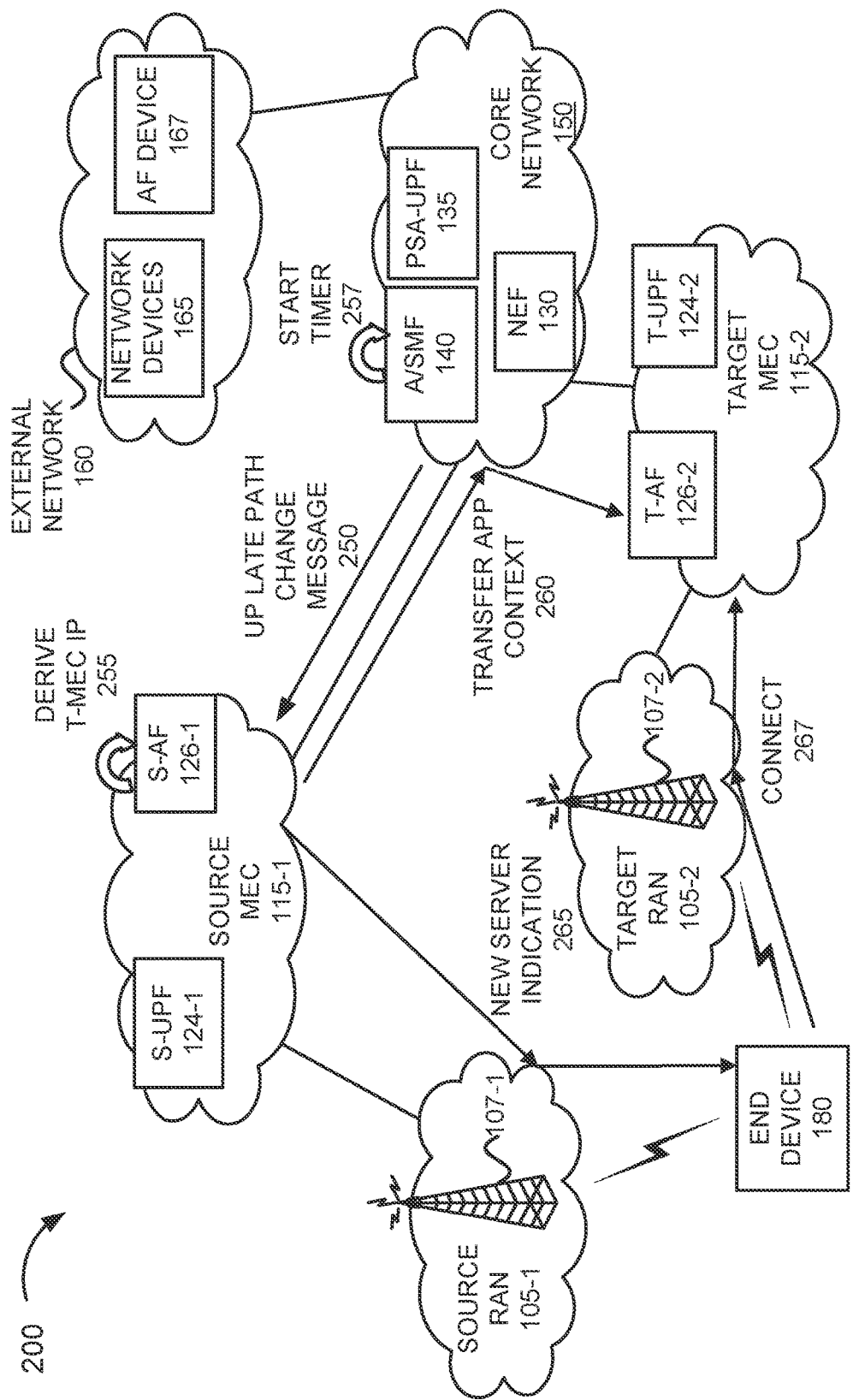

Referring to FIG. 2E, A/SMF 140 may send a UP late path change message 250 to S-AF 126-1. Message 250 may include an identification, such as a DNAI, for S-AF 126-1 and/or T-AF 126-2, as well as a unique identifier for end device 180. S-AF 126-1 may derive 255 an IP address for target MEC 115-2 based on the message 250. The IP address for end device 180 may be retained. A/SMF 140 may initiate a timer 257 corresponding to a duration of the session relocation.

As further illustrated in FIG. 2E, S-AF 126-1 transfers application context 260 to T-AF 126-2 via core network 150. Upon successful application context transfer, S-AF 126-1 (or alternatively, AF 170) notifies 265 the client on end device 180 of T-AF 126-2. End device 180 initiates contact to connect 267 to T-AF 126-2. Upon successful connection to T-AF 126-2, end device 180 discontinues communication with S-AF 126-1.

Figure 2F:
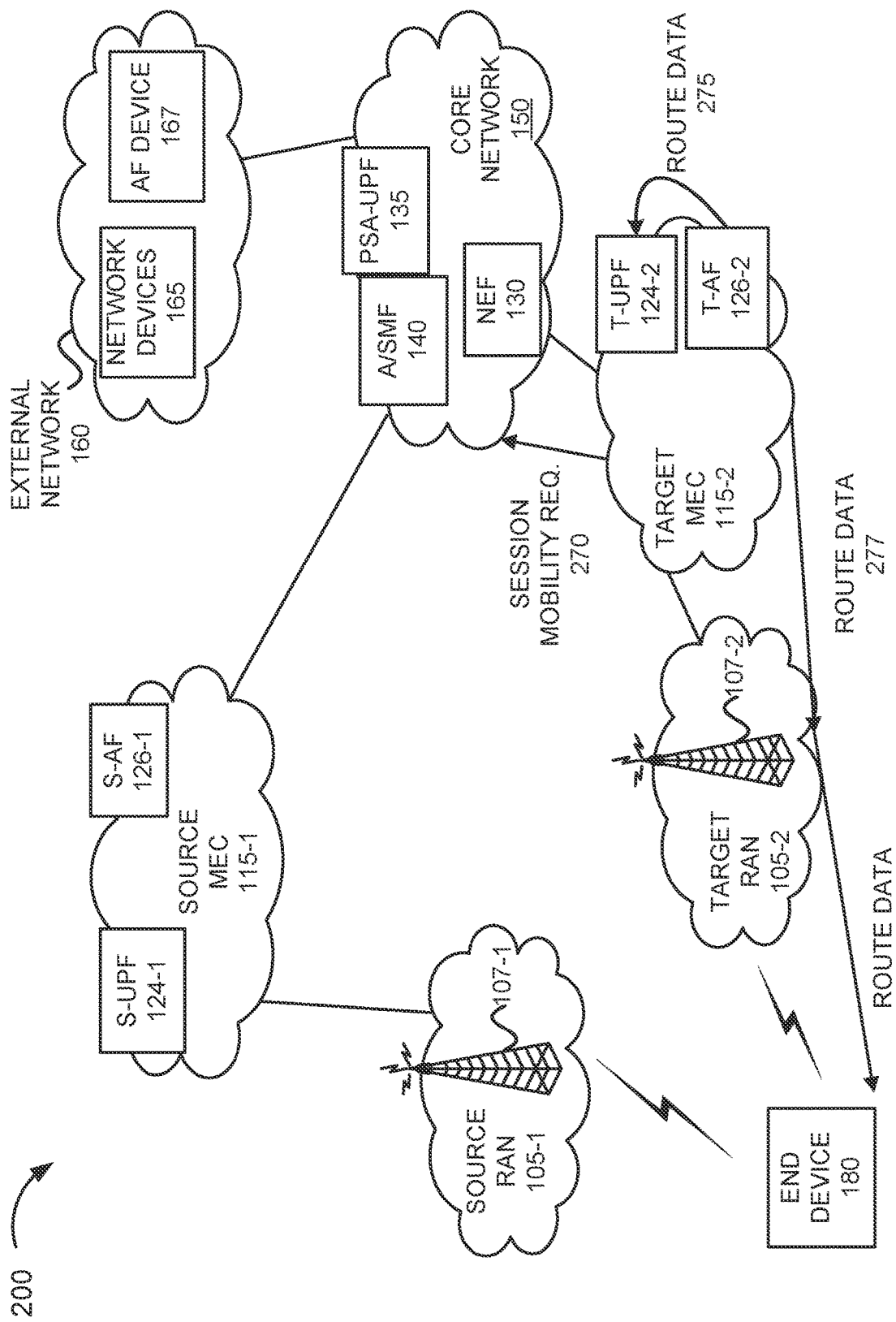

Referring to FIG. 2F, T-AF 126-2 sends a session mobility request 270 to NEF 130 for exposure of session mobility events. In some embodiments, T-AF 126-2 may get advanced notification from NWDAF 145 via NEF 130 based on a predicted mobility event for end device 180. In other embodiments, AF 167 may request early mobility notification from A/SMF 140 via NEF 130. Data from T-AF 126-2 is routed 275 to T-UPF 124-2. In turn, T-UPF 124-2 routes the data 277 to target RAN 105-2 and from there to end device 180.

Figure 2G:
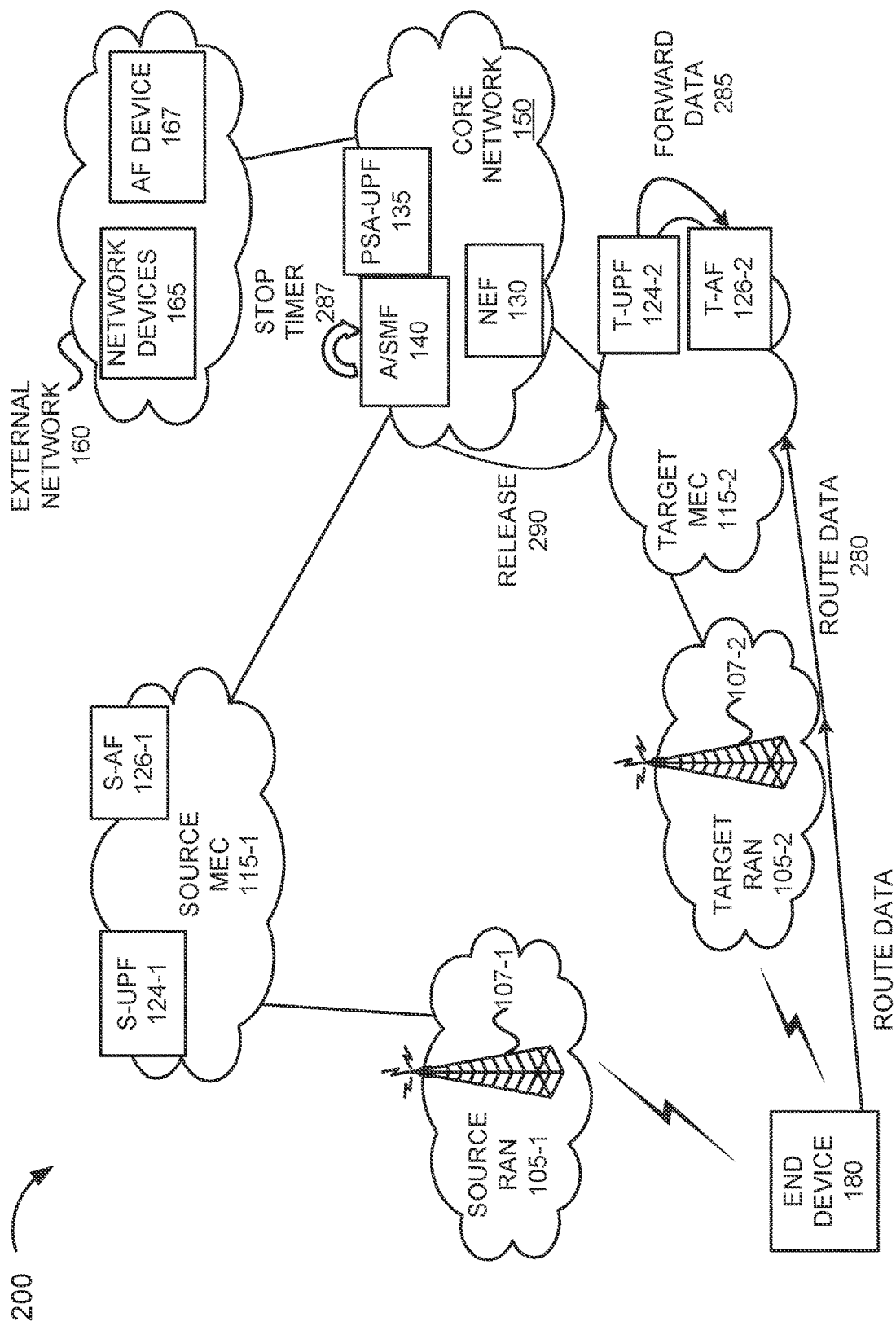

Referring to FIG. 2G, data from end device 180 is routed 280 via target RAN 105-2 to T-UPF 124-2. T-UPF 126-2 may forward the data 285 to T-AF 126-2. The timer may be maintained until a configurable amount of time for the migration process has elapsed, after which the timer is stopped 287, for example, by A/SMF 140. Once the timer is stopped, A/SMF 140 may direct S-UPF 124-1 to release the resources, which may include removing the resources entirely.

Although FIGS. 2A-2G illustrate exemplary processes of the edge network-based session relocation service, according to other exemplary embodiments, the process may include additional, different, and/or fewer steps, and/or include additional, different, and/or fewer messages. The processes illustrated and described in FIGS. 2A-2G are exemplary and according to various exemplary scenarios. According to an exemplary embodiment, the edge network-based session relocation service may perform various steps, as described, in relation to each application service requested by or provided to end device 180.

According to an exemplary embodiment, policies implemented a distributed architecture in which intermediate AFs coordinate to perform IP address management schemes for UE that moves across MEC site boundaries support the edge network-based session relocation service. According to another exemplary embodiment, although not illustrated, the policies may be implemented in a centralized architecture in which an anchor AF coordinates interactions between the intermediate application functions. An exemplary embodiment of edge network-based session relocation service associated with lossless application traffic forwarding is described further below.

Figure 3:
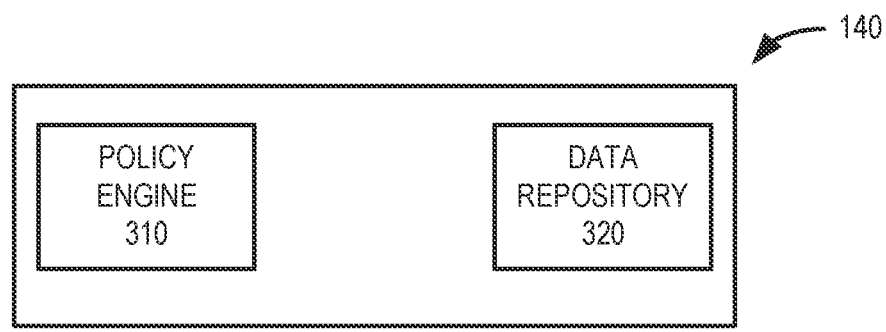
FIG. 3 is a diagram illustrating exemplary components of a device that may correspond to one or more of the devices illustrated and described herein.

FIG. 3 is a diagram illustrating exemplary components of A/SMF 140. As shown in FIG. 3, A/SMF 140 may include a policy engine 310, and a data repository 320. Each of user API platform 310, a policy engine 320, and a data repository 330 may be implemented as one or more core devices 155.

Policy engine 310 may integrate policies into service applications. Policy engine 310 may configure policies for user equipment (UE) IP address assignment based on MEC slice IDs and data network names (DNNs). According to an implementation, policy engine 310 may configure policies for a UPF anchor and intermediate UPF insertion based on MEC slice IDs and data network names (DNNs).

Data repository 320 may collect network data, such as performance metrics. In one implementation, data repository 320 may include or communicate with NWDAF 145. NWDAF 145 may facilitate coordination between intermediate AFs 126. For example, NWDAF 145 may collect accessibility key performance indicators (KPIs, e.g., an RRC setup success rate, a RAB success rate, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), and/or other types of wireless network KPIs. Data repository 320 may provide data to CU-UP DUs 126, periodically, in near-real time, or as resource availability permits. In another implementation, data from data repository 320 may be provided upon request. Data repository 320 may be a distributed component.

Figure 4:
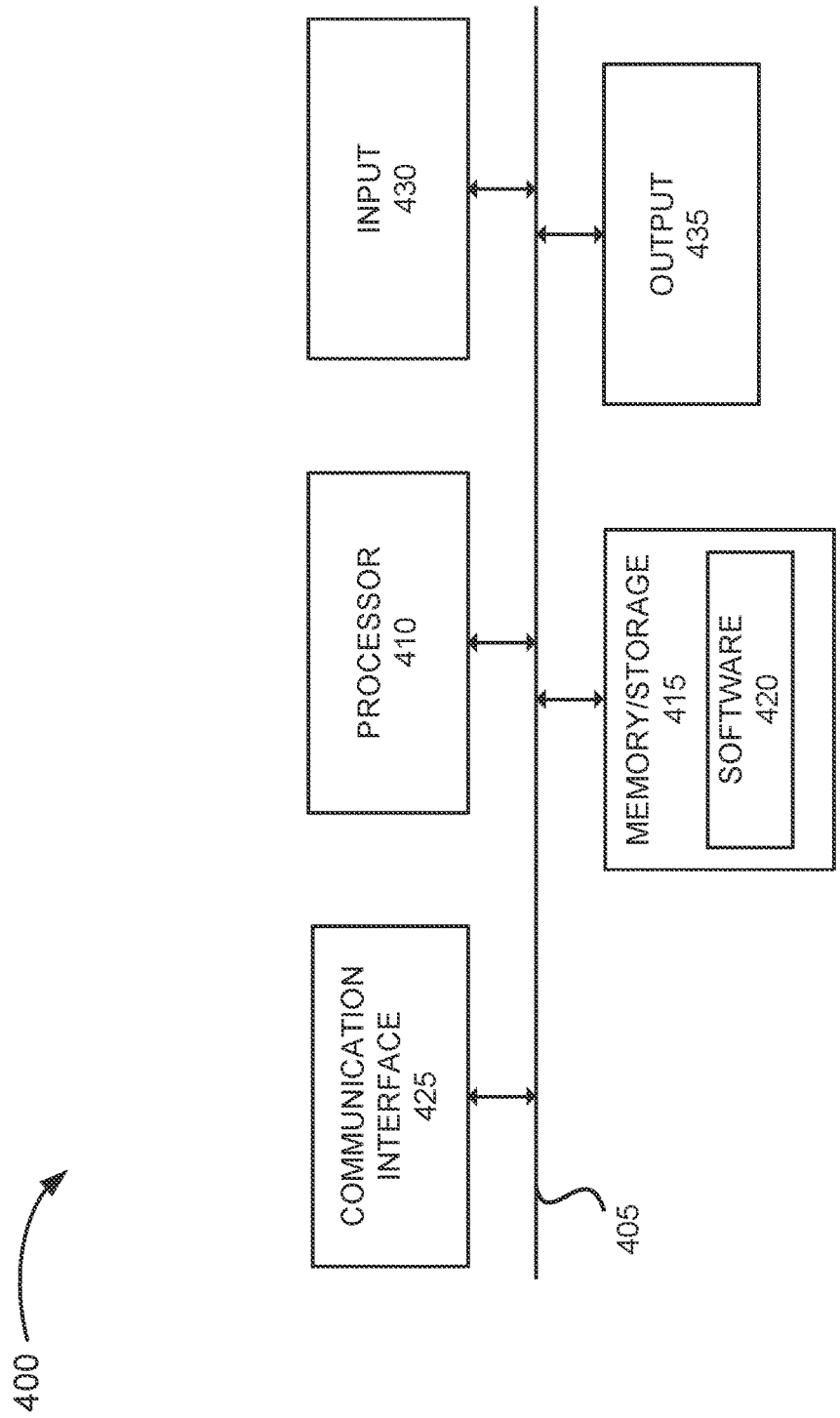
FIG. 4 is a block diagram illustrating exemplary components of a core network device of FIG. 1B.

FIG. 4 is a diagram illustrating exemplary components of a device 400 that may be included in one or more of the devices described herein. For example, device 400 may correspond to components included in access devices 107 of RANs 105, MEC devices 117 of MEC networks 115, core devices 155 of core network 150, network devices 165 of external network 160, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to NEF 130, PSA-UPF 135, A/SMF 140, and/or NWDAF 145, software 420 may include an application that, when executed by processor 410, provides a function of the edge network-based session relocation service, as described herein. Additionally, with reference to MEC devices 117, network devices 165, or another network device, software 420 may include an application that, when executed by a processor 410, provides a function of the edge network-based session relocation service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
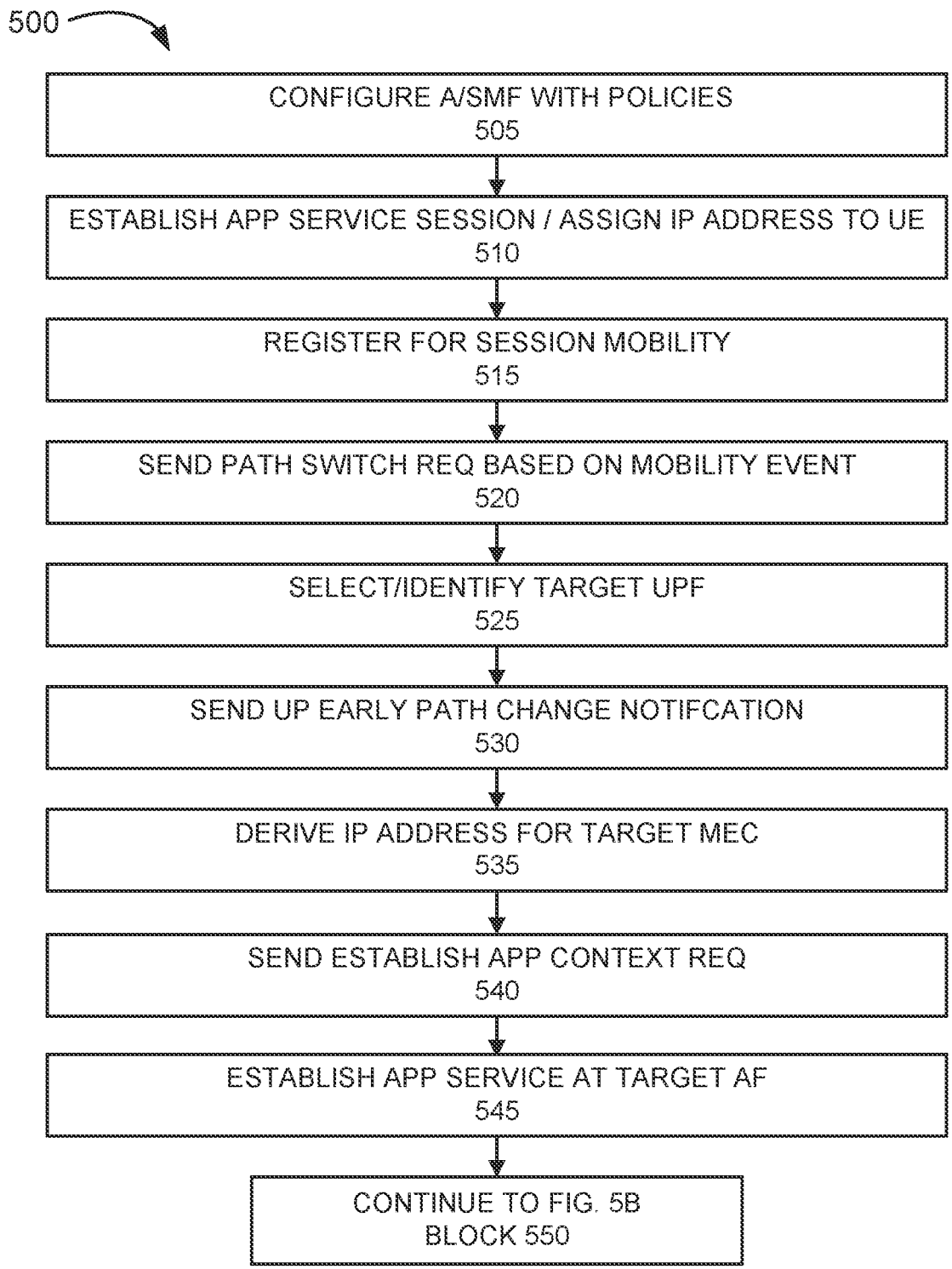
FIGS. 5A and 5B are flow diagrams illustrating an exemplary process of an exemplary embodiment of the session relocation service.
Figure 5B:
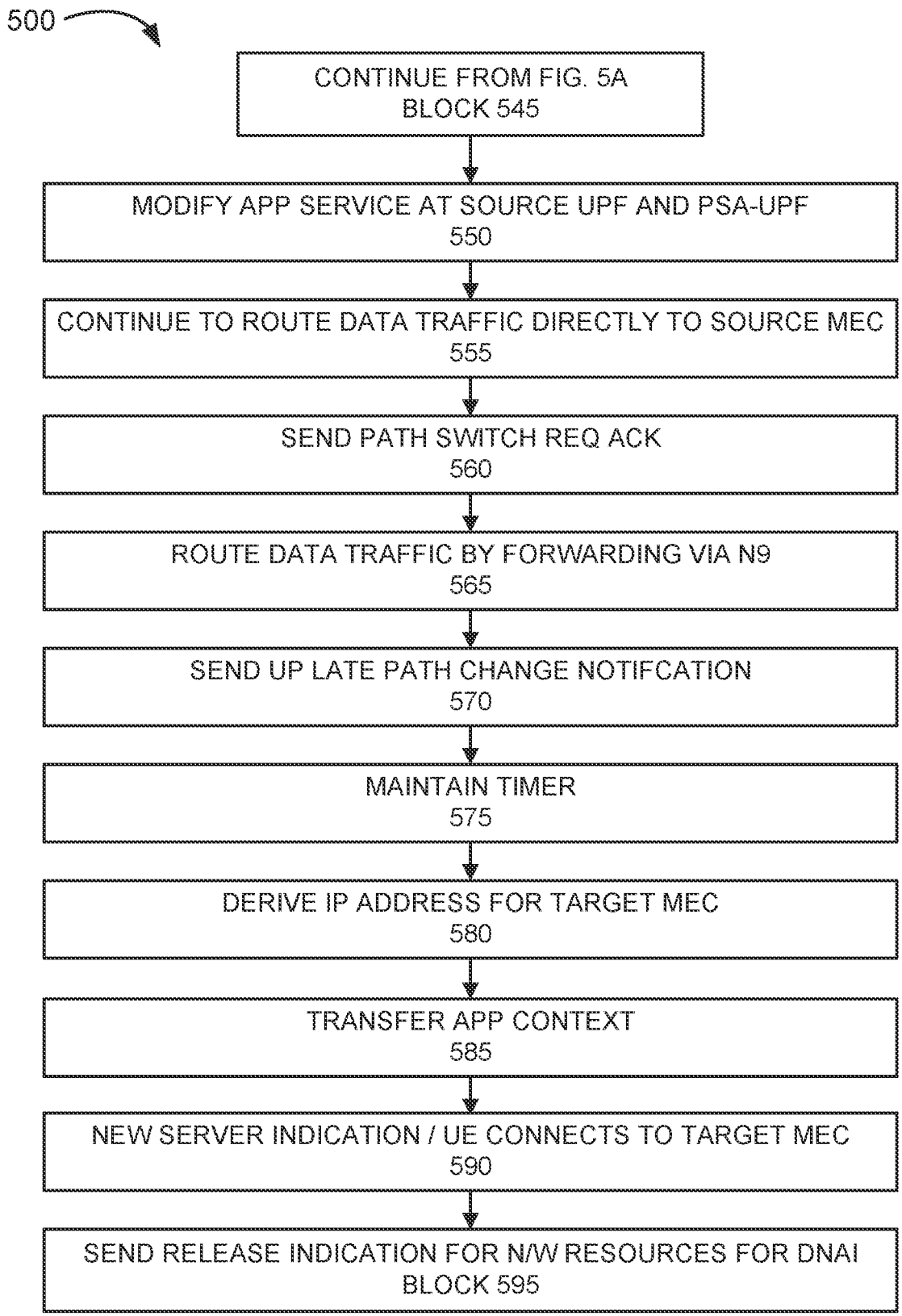

FIGS. 5A and 5B are flow diagrams illustrating an exemplary process 500 of one embodiment of the edge network-based session relocation service. According to an exemplary embodiment, A/SMF 140 performs some steps of process 500. According to an exemplary embodiment, NWDAF 145 performs other steps of process 500. For example, processor 410 executes software 420 to perform a step illustrated in FIGS. 5A and 5B, as described herein. Alternatively, a step illustrated in FIGS. 5A and 5B, and described herein, may be performed by execution of only hardware.

Referring to FIG. 5A, in block 505, A/SMF 140 and/or other devices may be configured with network policies and/or rules, such as UE IP assignment policies, UPF anchor and intermediate UPF insertion policies, etc., as described herein, and deployed in core network 150, for example.

In block 510, an application service session may be established for end device (UE) 180 located within a coverage area serviced by a first (source) MEC site 115 in a MEC network. For example, end device 180 may attach to source MEC site 115-1 at a gNB of source RAN 105-1. The application service session may make available an application service to end device 180 from source application function (AF) device 126-1 associated with S-UPF 124-1. End device 180 may be assigned an IP address. For example, A/SMF 140 may select an IP address from an address pool (e.g., subnet) of "permanent" IP addresses that can be preserved during inter-MEC mobility for end device 180. In one embodiment, A/SMF 140 may be configured with one or more policies to use a MEC network slice ID and/or a DNN associated with the application service session in selecting the IP address. In one embodiment, the IP address may be anchored at PSA-UPF 135.

In block 515, source AF device 126-1 may send an AF influence request to NEF 130 to register the application service session and/or end device 180 for session mobility. For example, source AF 126-1 may, based on an early mobility notification from A/SMF 140, instantiate target AF 126-2. In one embodiment, early mobility notification may be generated by NWDAF 145 via NEF 130 based on mobility prediction for end device 180 with respect to a coverage area served by source MEC 115-1 and a coverage area served by target MEC 115-2. Alternatively or additionally, AF 167 may request the early mobility notification.

In block 520, target RAN 105-2 may send a path switch request to A/SMF 140. For example, a mobility event for end device 180 may be detected. In response to the request, A/SMF 140 may select and/or identify target UPF 124-2 (block 525). In block 530, A/SMF 140 may then send a UP early path change notification to source AF 126-1. For example, the notification may include a DNAI for source UPF 124-1 and/or a DNAI for target UPF 124-2. In block 535, source AF 126-1 may derive an IP address for target MEC 115-2. In block 540, source AF 126-1 may send an establish application context message to target AF 126-2. For example, AF 126-1 may use the IP address for target MEC 115-2, as previously described, for sending the message.

In block 545, A/SMF 140 may establish the application service at target UPF 124-2. Referring to FIG. 5B, the application service at source UPF 124-1 and/or PSA-UPF 135 may be modified, for example, by A/SMF 140 (block 550). In block 555, data traffic from end device 180 may continue to be routed directly to source MEC 115-1. For example, source UPF 124-1 may be configured to route end device 180 traffic destined for source AF 126-1 directly—without forwarding to target UPF 124-2—even after context modification by A/SMF 140.

In block 560, A/SMF 140 sends a path switch request acknowledgement to target RAN 105-2. In block 565, target UPF 124-2 is configured to route data traffic from end device 180 destined for source AF 126-1 by forwarding (e.g., N9) via source UPF 124-1, for example, to maintain communication between end device 180 and source MEC 115-1. In block 570, A/SMF 140 may send a UP late path change notification to source AF 126-1. For example, the notification may include a DNAI for source UPF 124-1 and/or a DNAI for target UPF 124-2.

In block 575, A/SMF 140 may maintain a timer for a duration of the session relocation service. For example, a timer value may be configured and/or adjusted for each source AF 126-1 that is registered with "Application Relocation Possibility"="yes." Additionally or alternatively, based on the source network slice selection assistance information (NSSAI) may indicate a timer value. Stopping the timer may end the session relocation service. In block 580, source AF 126-1 may derive an IP address for target MEC 115-2. In block 585, source AF 126-1 may transfer application context to target AF 126-2.

In block 590, source AF 126-1 may send a notification to end device 180 identifying target AF 126-2, for example, upon successful transfer of application context to target AF 126-2. Additionally or alternatively, AF 167 may send the notification. Based on the notification, end device 180 may connect to target AF 126-2, and discontinue communication with source AF 126-1. In block 595, A/SMF 140 sends a release indication to source UPF 124-1. For example, upon expiration of the timer, A/SMF 140 sends a release indication associated with its DNAI to NEF 130.

Although FIGS. 5A and 5B illustrate an exemplary process 500 of the edge network-based session relocation service, according to other embodiments, process 500 may include additional operations, fewer operations, and/or different operations than those illustrated in FIGS. 5A and 5B, and described herein. For example, AF devices may be deployed at each MEC site, and an AF device may (in a centralized deployment scheme) or may not be deployed at a central application server in a distributed deployment scheme.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known in the art are expressly incorporated herein by reference and are intended to be encompassed by the claims.

What is claimed is:
1. A method comprising:
    establishing an application service session, from a source application node in a source multi-access edge computing (MEC) network, for accessing by an end device located within a first coverage area of the source MEC network;

registering, by the source application node, the application service session and the end device for an inter-MEC session relocation service with respect to a target MEC network associated with a second coverage area;
instantiating a target application node in the target MEC network responsive to a session mobility request;
requesting, by the target application node, an application context with the source application node;
determining whether the registering of the application service session and the end device includes an application relocation possibility indicator;
configuring, for the source application node based on a determination that the registering includes the application relocation possibility indicator, a timer value for routing data traffic associated with the application service session; and
routing, by the target application node and before an expiration of the timer value, the data traffic from the end device to the source application node.

2. The method of claim 1, further comprising:
predicting a mobility of the end device with respect to the first coverage area and the second coverage area to generate an advance mobility notification; and
generating the session mobility request based on the advance mobility notification.

3. The method of claim 1, further comprising:
detecting a mobility of the end device with respect to the first coverage area and the second coverage area to generate a mobility event; and
generating the session mobility request based on the mobility event.

4. The method of claim 3, further comprising:
sending the session mobility request to a network exposure function (NEF) device for exposure of the mobility event.

5. The method of claim 1, further comprising:
instantiating the application service session at the target application node upon receipt of the application context.

6. The method of claim 5, further comprising:
receiving a user plane late path change message including a data network access identifier for at least one of the source application node or the target application node.

7. The method of claim 1, wherein a duration of the routing corresponds to an adjusted amount of time, indicated in a network slice selection assistance information (NSSAI), for completing the inter-MEC session relocation service.

8. A system comprising:
a source application node instantiated in a source multi-access edge computing (MEC) network, comprising a first processor configured to:
establish an application service session for accessing by an end device located within a first coverage area of the source MEC network,
register the application service session and the end device for an inter-MEC session relocation service with respect to a target MEC network associated with a second coverage area, and
instantiate a target application node in the target MEC network responsive to a session mobility request; and
the target application node, comprising a second processor configured to:
request an application context with the source application node,
determine whether the registration of the application service session and the end device includes an application relocation possibility indicator,
configure, for the source application node based on a determination that the registration includes the application relocation possibility indicator, a timer value for routing of data traffic associated with the application service session, and
route, before an expiration of the timer value, the data traffic from the end device to the source application node.

9. The system of claim 8, wherein at least one of the first processor or the second processor are further configured to:
predict a mobility of the end device with respect to the first coverage area and the second coverage area to generate an advance mobility notification; and
generate the session mobility request based on the advance mobility notification.

10. The system of claim 8, wherein at least one of the first processor or the second processor are further configured to:
detect a mobility of the end device with respect to the first coverage area and the second coverage area to generate a mobility event; and
generate the session mobility request based on the mobility event.

11. The system of claim 10, wherein at least one of the first processor or the second processor are further configured to:
send the session mobility request to a network exposure function (NEF) device for exposure of the mobility event.

12. The system of claim 8, wherein at least one of the first processor or the second processor are further configured to:
instantiate the application service session at the target application node upon receipt of the application context.

13. The system of claim 12, wherein at least one of the first processor or the second processor are further configured to:
receive a user plane late path change message including a data network access identifier for at least one of the source application node or the target application node.

14. The system of claim 8, wherein a duration of the routing corresponds to an adjusted amount of time, indicated in a network slice selection assistance information (NSSAI), for completing the inter-MEC session relocation service.

15. A non-transitory computer-readable storage medium storing instructions executable by a processor of at least one of a source application node in a source multi-access edge computing (MEC) network or of a target application node in a target MEC network, which when executed cause at least one of the source application node or the target application node to:
establish an application service session for accessing by an end device located within a first coverage area of the source MEC network;
register the application service session and the end device for an inter-MEC session relocation service with respect to a target MEC network associated with a second coverage area;
instantiate a target application node in the target MEC network responsive to a session mobility request;
request an application context with the source application node;
determine whether the registration of the application service session and the end device includes an application relocation possibility indicator;

configure, for the source application node based on a determination that the registration includes the application relocation possibility indicator, a timer value for routing of data traffic associated with the application service session; and route, before an expiration of the timer value, the data traffic from the end device to the source application node.

16. The non-transitory computer-readable storage medium of claim 15, wherein the instructions further cause the at least one of the source application node or the target application node to:

predict a mobility of the end device with respect to the first coverage area and the second coverage area to generate an advance mobility notification; and generate the session mobility request based on the advance mobility notification.

17. The non-transitory computer-readable storage medium of claim 15, wherein the instructions further cause the at least one of the source application node or the target application node to:

detect a mobility of the end device with respect to the first coverage area and the second coverage area to generate a mobility event; and generate the session mobility request based on the mobility event.

18. The non-transitory computer-readable storage medium of claim 17, wherein the instructions further cause the at least one of the source application node or the target application node to:

send the session mobility request to a network exposure function (NEF) device for exposure of the mobility event.

19. The non-transitory computer-readable storage medium of claim 15, wherein the instructions further cause the at least one of the source application node or the target application node to:

instantiate the application service session at the target application node upon receipt of the application context.

20. The non-transitory computer-readable storage medium of claim 19, wherein the instructions further cause the at least one of the source application node or the target application node to:

receive a user plane late path change message including a data network access identifier for at least one of the source application node or the target application node.

* * * * *